Nov. 4, 1958 J. M. CLUWEN 2,859,336

FREQUENCY CONVERSION OF SIGNAL OSCILLATION WITHOUT USE OF AN AUXILIARY LOCAL OSCILLATION

Filed Oct. 1, 1952 2 Sheets-Sheet 1

INVENTOR
JOHANNES MEYER CLUWEN
BY [signature]
AGENT

Nov. 4, 1958 J. M. CLUWEN 2,859,336
FREQUENCY CONVERSION OF SIGNAL OSCILLATION WITHOUT USE
OF AN AUXILIARY LOCAL OSCILLATION
Filed Oct. 1, 1952 2 Sheets-Sheet 2

INVENTOR
JOHANNES MEYER CLUWEN
BY [signature]
AGENT

United States Patent Office 2,859,336

Patented Nov. 4, 1958

2,859,336

FREQUENCY CONVERSION OF SIGNAL OSCILLATION WITHOUT USE OF AN AUXILIARY LOCAL OSCILLATION

Johannes Meyer Cluwen, Eindhoven, Netherlands, assignor, by mesne assignments, to North American Philips Company, Inc., New York, N. Y., a corporation of Delaware Application October 1, 1952, Serial No. 312,578

Claims priority, application Netherlands October 22, 1951

2 Claims. (Cl. 250—20)

The invention relates to circuit-arrangements for amplifying electrical oscillations having a frequency $f$, with the aid of an electric discharge tube which is caused to self-oscillate.

The invention has, more particularly, for its object to provide a circuit-arrangement which is suitable to amplify the input oscillations by a high factor and to detect or limit them, for example, simultaneously.

In a prior suggestion is described an amplifying circuit-arrangement in which a low-frequency oscillation to be amplified is operative across a grid circuit of the electric discharge tube caused to self-oscillate, a small part of the oscillator voltage detected by means of an amplitude detector being supplied also to this grid in a sense such that an increase in oscillator amplitude produces a decrease in conductance of the oscillator tube, so that an amplified low-frequency oscillation is produced across the output of this detector.

It is furthermore known to amplify and to detect an amplitude-modulated input oscillation with the use of an electric discharge tube caused to self-oscillate, by causing this discharge tube to self-oscillate with the same frequency as that of the input oscillation and by detecting again the oscillation produced by the oscillator, after which the direct-voltage component of the detected oscillation re-adjusts the conductance of the tube. This circuit-arrangement has a limitation in that the oscillation thus produced by the oscillator may readily give rise to parasitic coupling and oscillation phenomena attended thereby, whilst it is moreover difficult to prevent the oscillation of the oscillator from being radiated backwards to the preceding circuit. There is a further difficulty in that already at a small difference between the input frequency and the tuning frequency of the oscillator circuit the oscillator frequency is no longer equal to the input frequency.

According to the invention use is made of a tube comprising at least two control-grids, the anode circuit of which includes at least one circuit not tuned to the input frequency $f$, between this anode circuit and the two control-grids of the tube being provided two feed-back paths having opposite feed-back polarities, so that the tube for at least an important part becomes self-oscillating owing to conversion amplification.

In order that the invention may be readily carried into effect, it will now be described in detail with reference to the accompanying drawing.

Figures 9, 10:
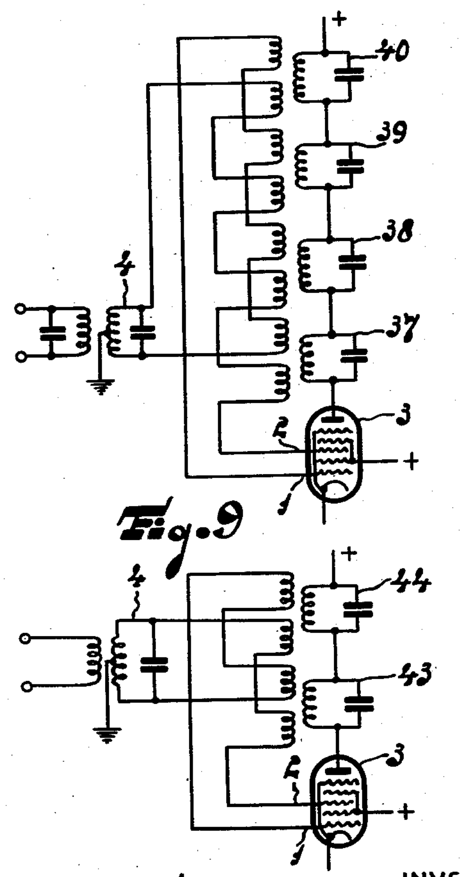
Fig. 9 shows a circuit-arrangement for amplifying and simultaneously producing oscillations having several frequencies.

Fig. 10 finally shows a circuit-arrangement for amplifying and detecting an amplitude-modulated oscillation with wholly or partly suppressed carrier-wave.

Figures 1, 2:
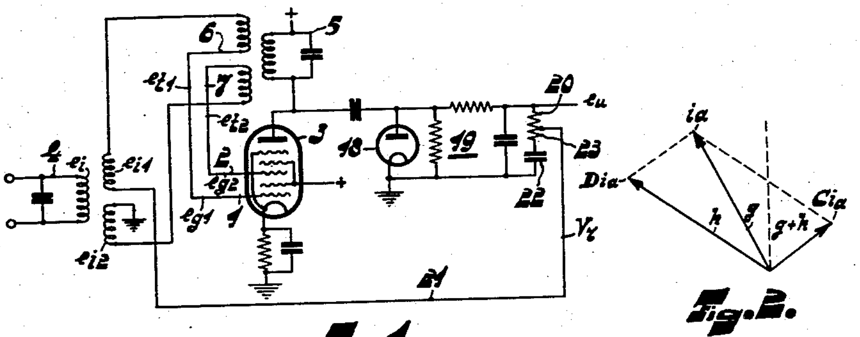
Fig. 1 shows a circuit-arrangement for amplifying and detecting an amplitude-modulated oscillation.
Fig. 2 shows a vector diagram to explain the circuit-arrangement shown in Fig. 1.

Fig. 1 shows an electric discharge tube comprising two control-grids 1 and 2, the amplitude-modulated input oscillation to be amplified and detected being supplied through an input circuit 4 to one or to both control-grids. The anode-circuit of the tube 3 includes a circuit 5, which is tuned to half the input frequency. Between this circuit 5 and the two control-grids 1 and 2 provision is made of two feed-back paths 6 and 7, having opposite feed-back polarities, owing to which the tube 3 is caused to self-oscillate, at least for an important part, by conversion amplification, the frequency being $\frac{1}{2}f$.

This self-oscillation may be explained with reference to the following calculation and the vector diagram shown in Fig. 2.

To the anode current $i_a$ of the tube 3 applies the relation:

$$i_a=(a_1+b_1e_{g1})(a_2+b_2e_{g2}) \quad (1)$$

wherein $e_{g1}$ and $e_{g2}$ designate the voltages at the two control-grids 1 and 2 and $a_1$ $b_1$, $a_2$ $b_2$ may be considered to be substantially constant at a definite adjustment of the tube.

In the mode of arrangement shown these grid voltages $e_{g1}$ and $e_{g2}$ fulfill the relations:

$$e_{g1}=-e_{t1}+e_{i1}$$
$$e_{g2}=e_{t2}-e_{i2} \quad (2)$$

wherein $e_{i1}$ and $e_{i2}$ designate two voltages derived from the input oscilaltion and wherein the feed-back voltages $e_{t1}$ and $e_{t2}$ are assumed the relations:

$$e_{t1}=Z_1i_a\epsilon^{jh}$$
$$e_{t2}=Z_2i_a\epsilon^{jh} \quad (3)$$

wherein $Z_1$ and $Z_2$ designate the moduli and $h$ the phase displacement (argument) of the transmission impedances of the feed-back networks 5—6 and 6—7.

If the input oscillation $e_i$ is assumed to be $e_i \cos ft$ and if the anode current $i_a$ is $i_a \cos(\frac{1}{2}ft+g)$, wherein $g$ designates the phase angle to be determined, the substitution of the Equations 2 and 3 in the Equation 1 shows that:

$$i_a \cos(\tfrac{1}{2}ft+g)=(a_1+b_1e_{i1}\cos ft-b_1Z_1i_a\cos(\tfrac{1}{2}ft+g+h)).$$
$$(a_2-b_2e_{i2}\cos ft+b_2Z_2i_a\cos(\tfrac{1}{2}ft+g+h))$$

or $$i_a\cos(\tfrac{1}{2}ft+g)=$$
$$+Di_a\cos(\tfrac{1}{2}ft+g+h)+Ci_a\cos(\tfrac{1}{2}ft-g-h)+ \quad (4)$$

wherein the terms comprising cos $2ft$, cos $3/2ft$, cos $ft$ and the constant term are left out of consideration and wherein $$D=a_1b_2Z_2-a_2b_1Z_1$$

and $$C=\tfrac{1}{2}b_1b_2(e_{i1}Z_2+e_{i2}Z_1) \quad (5)$$

Thus the circuit-arrangement is caused to self-oscillate in the frequency $\frac{1}{2}f$, if the values D and C are such that the above Equation 4 as far as the terms including cos $\frac{1}{2}ft$ are concerned shows equality. If the phase angles $g$ and $h$ are assumed to be zero, the self-oscillation condition is:

$$D+C=1 \qquad (6)$$

The term D designates the direct amplification of the tube, since it is produced by the amplification of the feed-back voltage without mixture with the input oscillation. The term C, on the other hand designates the conversion amplification of the tube, since it is formed by the mixed product of the input oscillation $e_1$ at one control-grid and the feed-back voltage $e_t$ at the other control-grid.

As is evident from the references for the feed-back voltages $e_{t1}$ and $e_{t2}$, it is possible to keep the direct amplification term D small, in which case the tube is set, at least for an important part, to self-oscillate owing to the conversion amplification term C. Comparatively great differences between the oscillator frequency $\frac{1}{2}f$ and the resonance frequency of the circuit 5 are now allowed. This means that the phase angles $g$ and $h$ are allowed to assume comparatively high values without causing the arrangement to get out of synchronism.

This may be obvious from the vector diagram shown in Fig. 2, in which the anode current $i_a$ and the two feed-back terms $D_{ia}$ and $C_{ia}$ of Equation 4 are illustrated and in which the condition of self-oscillation is fulfilled, if the vectorial sum of the vectors $C_{ia}$ and $D_{ia}$ is exactly equal to the vector $i_a$. Consequently the vectors adjust themselves in a manner such that to the phase angles $g$ and $h$ applies the relation:

$$\frac{\sin(2g+h)}{\sin h}=\frac{D}{C} \qquad (7)$$

This relation cannot be fulfilled, i. e. the oscillator gets out of synchronism, as soon as $D/C \sin h$ would exceed 1.

If a certain margin is allowed between $\frac{1}{2}f$ ($f$ designates the frequency of the input oscillation) and the resonance frequency of the circuit 5, within which the oscillator should remain in synchronism with $\frac{1}{2}f$, this corresponds to a maximum permissible value for the phase displacement $h$ of the circuit 5 at the frequency $\frac{1}{2}f$ and hence a maximum permissible value for the ratio $D/C$. In practice this ratio may be considerably higher than 1, in order to obtain a satisfactory operation of the circuit-arrangement, but it would become inadmissibly high, if the feed-back factors of the feed-back paths 6 and 7 had the same polarity, so that the two terms of the expression for D according to the Equation 5 would have equal polarities.

Figure 3:
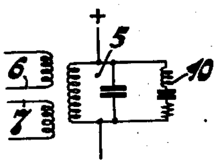
Figs. 3, 4 and 5 show variants of the feed-back circuit of the circuit-arrangement shown in Fig. 1.
Figure 4:
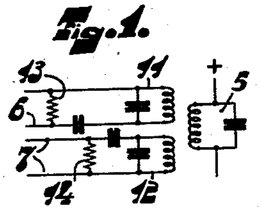
Figure 5:
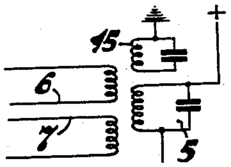

The phase displacement $h$ can be kept artificially small by connecting parallel with the circuit 5 in series circuit 10, tuned to the same frequency and having a correctly proportioned damping, as is shown in Fig. 3, by including in the feed-back paths 6 and 7 circuits 11 and 12, coupled critically to the circuit 5 and tuned to the same frequency and 90°-phase-displacement networks 13 and 14, illustrated in Fig. 4, or, as is shown in Fig. 5, by connecting to the circuit 5 a circuit 15, tuned to the same frequency and damped correctly.

The oscillation produced across the circuit 5, shown in Fig. 1, is detected with the aid of an amplitude detector 18, comprising an output filter 19. The latter comprises a potentiometer 20, from which a control-voltage $V_r$ is derived and supplied via the lead 21 to the control-grid 1 of the tube 3 in a sense such that the direct amplification term D becomes smaller, in the present case, more negative, at an increase in amplitude of the oscillation produced by the oscillator across the circuit 5.

If the part of the potentiometer 20, from which the control voltage $V_r$ is derived, is constituted only by the capacitor 22 shown, which has a negligible impedance for the modulation frequency, the voltage $V_r$ will adjust the direct amplification term D of the tube 3 in a manner such that for the mean amplitude of the input oscillation $e_i$ the self-oscillation condition (6) or, in general, that found in Fig. 2 is fulfilled. An increase in amplitude of the input oscillation $e_i$ now produces a further undamping of the oscillator and hence an increase in oscillator amplitude. On the contrary, a decrease in amplitude of the input oscillation $e_i$, produces a damping of the oscillator and hence a decrease in oscillator amplitude. Thus an amplified and demodulated oscillation $e_u$ corresponding to the amplitude modulation of the input oscillation $e_i$ is produced across the potentiometer 20.

The control-voltage $V_r$ is preferably taken from the series combination of a resistor 23 and the said capacitor 22, this series combination having a time constant exceeding the period of the lowest modulation frequency. The resistor 23 is small relative to the further resistance of the potentiometer 20. Thus a reduction of the distortion of the amplifier is obtained.

Figure 6:
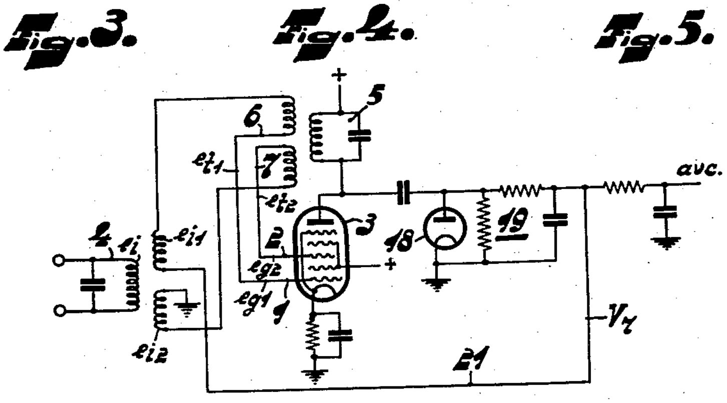
Fig. 6 shows a modification of the circuit-arrangement shown in Fig. 1, which is suitable for amplifying and limiting an electrical oscillation.

If, on the contrary, as is illustrated in Fig. 6, the entire voltage across the output filter 19 of the amplitude detector 18 is used as a control-voltage $V_r$, each instantaneous increase in oscillator amplitude will give rise to a decrease in the direct amplification term D and hence counteract this instantanous increase in amplitude. Then the circuit-arrangement produces across the circuit 5 an oscillation, which is amplified and limited relative to the input oscillation $e_i$ and may thus be used, for example, in a frequency-modulation receiver. The control-voltage may, if necessary subsequent to smoothing, be supplied also as an automatic gain control-voltage (A. V. C.) to a preceding tube of the circuit-arrangement (not shown).

Figure 7:
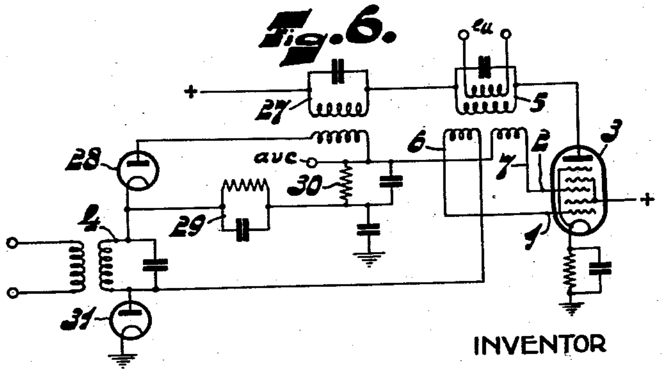
Fig. 7 shows a further circuit-arrangement for amplifying and limiting an electrical oscillation.

Fig. 7 shows a further circuit-arrangement for amplifying and limiting an electrical oscillation, for example, a frequency-modulated oscillation. Between the anode circuit 5 the resonance frequency of which is again half that of the input circuit 4 and the two control-grids 1 and 2 of the tube 3 provision is again made of two feed-back paths 6 and 7, having opposite feed-back polarities, so that the tube 3 again produces itself an oscillation having a frequency of $\frac{1}{2}f$. The anode circuit of the tube 3 includes an additional second circuit 27, tuned to the frequency $f$, across which, owing to direct amplification and conversion amplification of the input oscillation at the control-grid 1 and the self-oscillating oscillation at the control-grids 1 and 2, is produced a voltage, the amplitude of which increases, if, owing, to an increase in input amplitude, the voltage across the circuit 5 increases. This voltage across the circuit 27 is detected with the aid of the amplitude detector comprising an output filter 29, having a small time constant for the modulation frequencies, whilst, if necessary in series with the output filter 29 is connected an additional second filter 30, having a high time constant for the modulation frequencies, the voltage of which is supplied to the second control-grid 2 in order to reduce the direct amplification term D, at an increase in mean oscillator amplitude, which voltage may, if desired, also be used as an automatic gain control-voltage (A. V. C.) in a preceding tube of the circuit-arrangement.

The voltage at the left-hand end of the output filter 29 becomes more positive at an instantaneous increase in amplitude of the oscillation produced by the oscillator, so that a rectifier 31, included in the input circuit 4, becomes more conductive and thus produces an increase in damping of the circuit 4, so that the increase in amplitude of the oscillation produced by the oscillator is counteracted.

Figure 8:
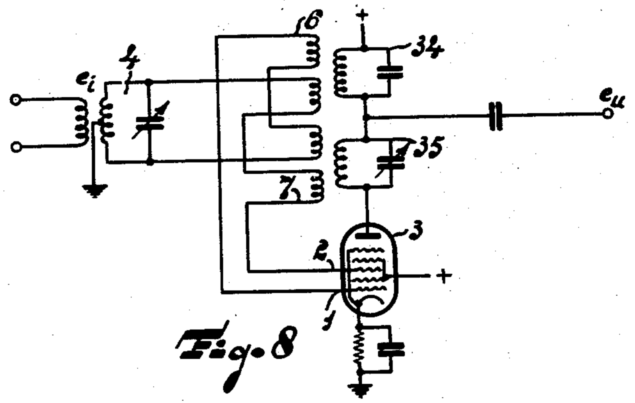
Fig. 8 shows a circuit-arrangement for the amplification and frequency feed-back or frequency re-adjustment of a modulated oscillation.

Fig. 8 shows a circuit-arrangement for amplification and frequency feed-back of a frequency-modulated input oscillation $e_i$, having a frequency $f$. For this purpose the anode circuit of the tube 3 includes two circuits 34 and 35, of which one (34) is tuned to an intermediate frequency $f_m$, which is preferably not in harmonic relationship with the input frequency $f$, the other (35) to a frequency $f_o$, equal to the sum of or the difference between the input frequency $f$ and the intermediate frequency $f_m$. Between the anode circuits 34 and 35 and the control-grids 1 and 2 of the tube 3 are again provided two feed-back paths 6 and 7, having opposite feed-back polarities, so that the oscillations having the frequencies $f_o$ and $f_m$ are produced by the circuit-arrangement itself; in the case of correct proportioning, for the major part by the mixture of these oscillations at the one control-grid with the input oscillation at the other control-grid. If the phase displacement of the feed-back voltage relative to the anode current of the circuit 34 exceeds considerably that of the circuit 34 at the same frequency sweep of the oscillations across these circuits, which is in general the case, if the tuning frequency $f_m$ of the circuit 34 is small relative to that ($f_o$) of the circuit 35, the frequency sweep of the oscillation across the circuit 34 will become only a small portion of that of the input oscillation, so that frequency feed-back of the input oscillation is obtained.

The circuit-arrangement shown in Fig. 8 is also suitable for automatic readjustment in frequency of an amplitude-modulated or a frequency-modulated oscillation. In order to avoid in this case that the frequency margin, within which a definite input oscillation still produces a corresponding intermediate-frequency oscillation, should depend on the input amplitude, the transmission network 34—6 is provided preferably in a manner such that the phase of the feed-back voltage first increases and then decreases at an increase in frequency sweep.

By extending the circuit-arrangement shown in Fig. 8 to form that shown in Fig. 9 it is possible to produce simultaneously oscillations having several frequencies. The anode circuit of the tube 3 includes, for this purpose, a plurality of circuits 37, 38, 39, 40, the tuning frequencies of which differ from one another by an amount equal to the frequency of the input oscillation across the circuit 4. By coupling back each of these circuits with opposite feed back polarity to the two control-grids 1 and 2 of the tube 3, the tube will start to self-oscillate in at least one of these tuning frequencies and then produce simultaneously, by the mixture with the input oscillation, all the other oscillations. In this case frequency stabilization of the oscillations produced may be obtained in a simple manner, for example, by supplying also an oscillation of stabilized frequency to one or to both the control-grids, this stabilized frequency being equal to the sum of the tuning frequencies of two of the circuits, preferably the two central circuits, in regard of the tuning frequencies.

Fig. 10 shows a circuit-arrangement for the reception of an amplitude-modulated oscillation having a wholly or partly suppressed carrier wave. This oscillation is again supplied across an input circuit 4, tuned to the carrier-wave frequency (which may be suppressed), to one or to both control-grids of the mixing tube 3, the anode circuit of which includes two circuits 43 and 44, of which one (43) is tuned to the carrier-wave frequency, the other (44) to a modulation frequency. By coupling back these anode circuits 43 and 44 to the control-grids 1 and 2 of the tube 3, the tube 3 again starts to self-oscillate.

By connecting means (not shown) for limiting the carrier-wave oscillation to the circuit 43 (Fig. 10) or to one of the anode circuits shown in Figs. 9 or 8, the amplitude of the demodulated oscillation across the circuit 44 corresponds to that of the modulation oscillation of the input signal. The said means may, for example, be an incandescent lamp, a non-linear impedance, a rectifier connected in series with an RC-filter, having a high time constant for the modulation frequencies, or an amplitude detector, the output voltage readjustments the direct amplification term D of the tube 3 in the manner illustrated in Figs. 1 or 6.

What I claim is:

1. A circuit arrangement for amplifying electrical oscillations in a first frequency range by means of a self-oscillating circuit, comprising an electron discharge device having two control grids and an output electrode, means connected to bias said control grids above cut-off, a first inductance connected to receive said electrical oscillations, second and third inductances coupled inductively to said first inductance, bias voltage means connected to one end of each of said second and third inductances, an output resonant circuit comprising a fourth inductance connected to said output electrode, a fifth inductance connected between one of said control grids and the remaining end of said second inductance and coupled inductively to said fourth inductance, and a sixth inductance connected between the other of said control grids and the remaining end of said third inductance and coupled inductively to said fourth inductance in a sense opposite to said inductive coupling of the fifth inductance, said output resonant circuit being tuned to the frequency of local oscillations to be generated within a second frequency range different from said first frequency range, whereby said local oscillations are generated in said second frequency range by means of conversion amplification in said electron discharge device.

2. A circuit as claimed in claim 1, in which said bias voltage means comprises an amplitude detector coupled to said output circuit to produce a stabilizing control voltage, and means connected to apply said control voltage to said one end of one of said second and third inductances.

References Cited in the file of this patent

UNITED STATES PATENTS

| | | |
|---|---|---|
| 2,034,513 | Grimes et al. | Mar. 17, 1936 |
| 2,042,636 | Schriever | June 2, 1936 |
| 2,107,395 | Schlesinger | Feb. 8, 1938 |
| 2,122,283 | Harris | June 28, 1938 |
| 2,432,183 | Van Slooten et al. | Dec. 9, 1947 |
| 2,440,073 | Bradley | Apr. 20, 1948 |
| 2,503,780 | Van der Ziel et al. | Apr. 11, 1950 |
| 2,582,725 | Stutt et al. | Jan. 15, 1952 |

FOREIGN PATENTS

| | | |
|---|---|---|
| 215,785 | Great Britain | Dec. 24, 1924 |